United States Patent [19]

Fejer et al.

[11] Patent Number: 4,650,322
[45] Date of Patent: Mar. 17, 1987

[54] METHOD AND MEANS FOR HIGH RESOLUTION MEASUREMENT OF FIBER DIAMETER

[75] Inventors: Martin M. Fejer, Atherton; Gregory A. Magel, Palo Alto; Robert L. Byer, Stanford, all of Calif.

[73] Assignee: The Board of Trustees of The Leland Stanford, Jr. University, Palo Alto, Calif.

[21] Appl. No.: 648,454

[22] Filed: Sep. 7, 1984

[51] Int. Cl.[4] ................. G01N 21/84; G01B 11/10
[52] U.S. Cl. ................................. 356/73.1; 356/385
[58] Field of Search ................. 356/73.1, 384, 385, 356/386

[56] References Cited

U.S. PATENT DOCUMENTS

| 3,937,580 | 2/1976 | Kasdan | 356/384 |
| 4,021,217 | 5/1977 | Bondybey et al. | 356/73.1 X |
| 4,027,977 | 6/1977 | Frazee, Jr. et al. | 356/73.1 |

FOREIGN PATENT DOCUMENTS 103374 8/1979 Japan ................. 356/384

Primary Examiner—Vincent P. McGraw
Attorney, Agent, or Firm—Flehr, Hohbach, Test, Albritton & Herbert

[57] ABSTRACT

Changes in the diameter of a fiber are determined by directing a laser beam transversely onto the fiber and directing a fringe produced by the scattering of the beam to a photodiode array by means of a transforming lens. Circuitry is provided to detect movement of the fringe on the diode array thereby indicating changes in the diameter of the crystal fiber.

10 Claims, 11 Drawing Figures

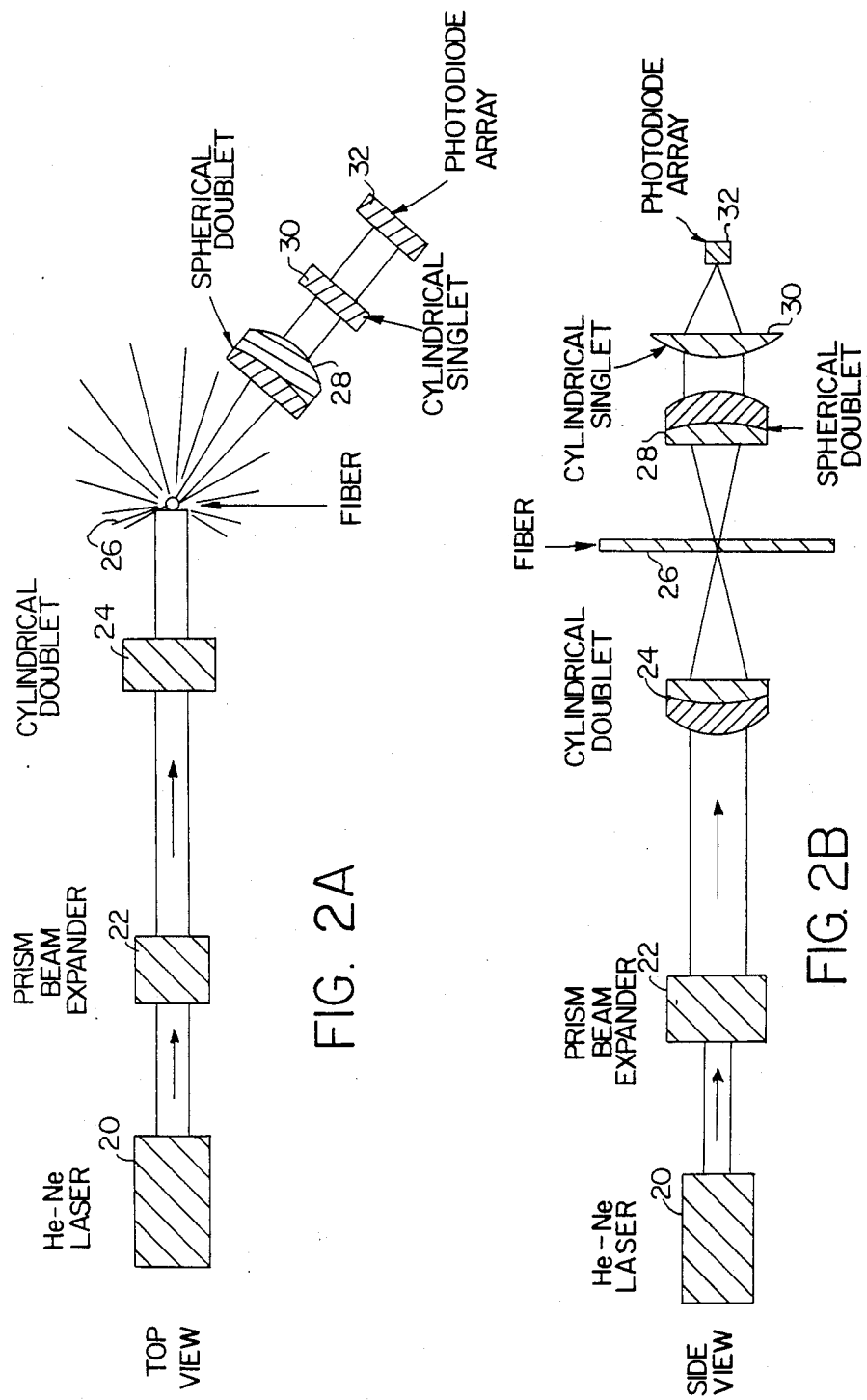

METHOD AND MEANS FOR HIGH RESOLUTION MEASUREMENT OF FIBER DIAMETER

The U.S. Government has rights in this invention pursuant to Contract No. AF F4962084C0021 and No. JSEP N001475C0632.

This invention relates generally to the physical measurements of wires and fibers, and more particularly in one application the invention relates to the measurement of crystal fiber diameter as the fiber is grown.

U.S. Pat. No. 4,421,721 for "Apparatus for Growing Crystal Fibers" discloses apparatus for growing fibers including drive means for a source rod, the optical system for uniformly melting a tip of the source rod by focused laser beam, and drive means for a crystal fiber pulled from the molten tip of the source rod.

The crystal growth process involves melting the tip of a source rod with a tightly focused $CO_2$ laser, dipping a seed crystal into the melt and then effecting a diameter reduction by pulling the seed more rapidly than feeding in the source. Since there is no viscous draw-down region in this process, small scale diameter variations tend to be frozen into the fiber instead of being stretched out to long periods and low amplitudes as in glass fiber pulling. It is thus necessary that the measurement system have high axial resolution, in addition to diameter resolution. The laser focusing optics and the short thermal time constant of the molten zone impose additional constraints on the working distance and the measurement rate.

While the diameter control tolerances and the growth parameters depend in detail on the material and device application involved, the following criteria specify a measurement system useful for a broad range of potential applications: diameter resolution better than 0.1% for fiber diameters between 20 and 500 $\mu$m, axial resolution better than 10 $\mu$m, working distance greater than 100 mm and measurement rate faster than 100 Hz.

As disclosed in U.S. Pat. No. 4,421,721, supra, the forward scattering pattern from a fiber illuminated by a laser beam perpendicular to the fiber axis can be used to determine the diameter of the fiber. More particularly, fiber diameter measurement device based on counting the number of fringes scattered into a particular angular range can be employed. While the speed and resolution of the disclosed device is suitable for many applications, the optical system for imaging the requisite large (60°) angular range becomes quite unwieldly at 100 mm working distances. Moreover, the lack of any provision for axial resolution, or the selection of a thin section whose diameter is to be measured, limits the usefulness of the device for single crystal fiber growth.

The present invention is directed to the measuring of fiber diameter and the physical measurements of wires and fibers generally by simplified system which accurately tracks the position of the center of a single fringe scattered at a certain angle rather than through attempting to count the number of fringes. In one implementation the system permits diameter resolution of at least 0.1% for fiber diameters between 20 and 500 microns, axial resolution of at least 10 microns, working distance of at least 100 millimeters, and measurement rate of at least 100 Hz.

Briefly, the apparatus includes a laser beam source and a cylindrical lens for transversely focusing the laser beam on the grown fiber for axial resolution. The laser beam scattered by the fiber is focused by lens means onto a photodiode array for determining diameter. In accordance with one feature of the invention, a transforming lens such as a Fourier transforming lens is employed to project a fringe onto the array, the transforming lens functioning to eliminate sensitivity to transverse motion of the fiber. Movement of the fringe due to fiber diameter variation is detected by the array and used to measure relative diameter changes.

In one embodiment, the output of the photodiode array is a series of voltage levels which are serially clocked. Electronic circuitry is provided for locking onto one of the peaks of the interference pattern and tracking the location of that peak on the diameter array as the peak moves in response to fiber diameter changes.

The invention and objects and features thereof will be more readily apparent from the following detailed description and appended claims when taken with the drawing, in which:

FIGS. 2A and 2B are a top view and a side view, respectively, of apparatus in accordance with one embodiment of the invention.

Figure 1:
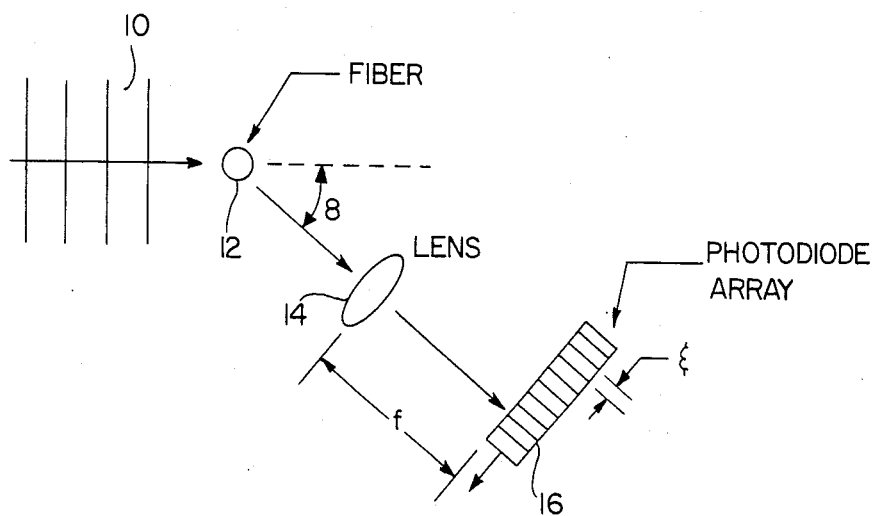
FIG. 1 is a schematic illustration of an optical system for measuring fiber diameter in accordance with the invention.

Referring now to the drawings, FIG. 1 is a schematic diagram illustrating the measurement of relative diameter changes in accordance with the invention. A focused laser beam 10 is transversely projected onto a fiber 12, and a lens 14 oriented at an angle $\theta$ with respect to the axis of the beam 10 is positioned to focus a refracted and reflected beam onto a photodiode array 16. The center-to-center spacing of the array element is $\xi$. Rather than counting all of the fringes within a given angle, the photodiode array 16 will provide signals for tracking a single interference fringe to determine relative diameter changes of the fiber.

FIGS. 2A and 2B are a top view and a side view, respectively, of apparatus in accordance with one embodiment of the invention. A two milliwatt He-Ne laser and variable attenuator 20 provide a laser beam with power in the range of 0.5 to 1.5 milliwatt to a prism beam expander 22. The expanded beam from expander 22 is then directed to a cylindrical doublet lens 24 which transversely focuses the laser beam on the fiber 26. A spherical doublet lens 28 in combination with a cylindrical singlet lens 30 receive and focus a refracted and reflected beam onto the photodiode array 32. The focal length of both the cylindrical and Fourier transforming lens is 120 millimeters and the photodiode array has 512 25 micron elements on 50 micron centers.

The output of the photodiode array is a series of 512 voltage levels which will clock serially at a 0.5 megahertz rate so that one scan is completed in one millisecond.

Figure 4:
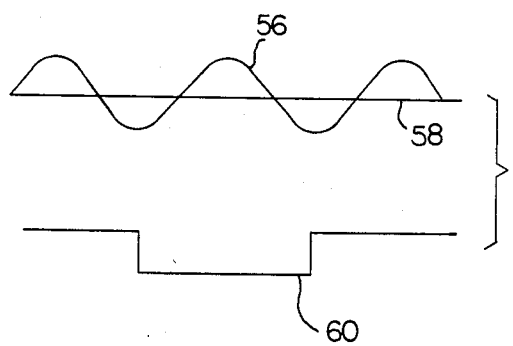
FIG. 4 is a plot of window signal and integrator output of the circuitry of FIG. 3.
Figure 3:
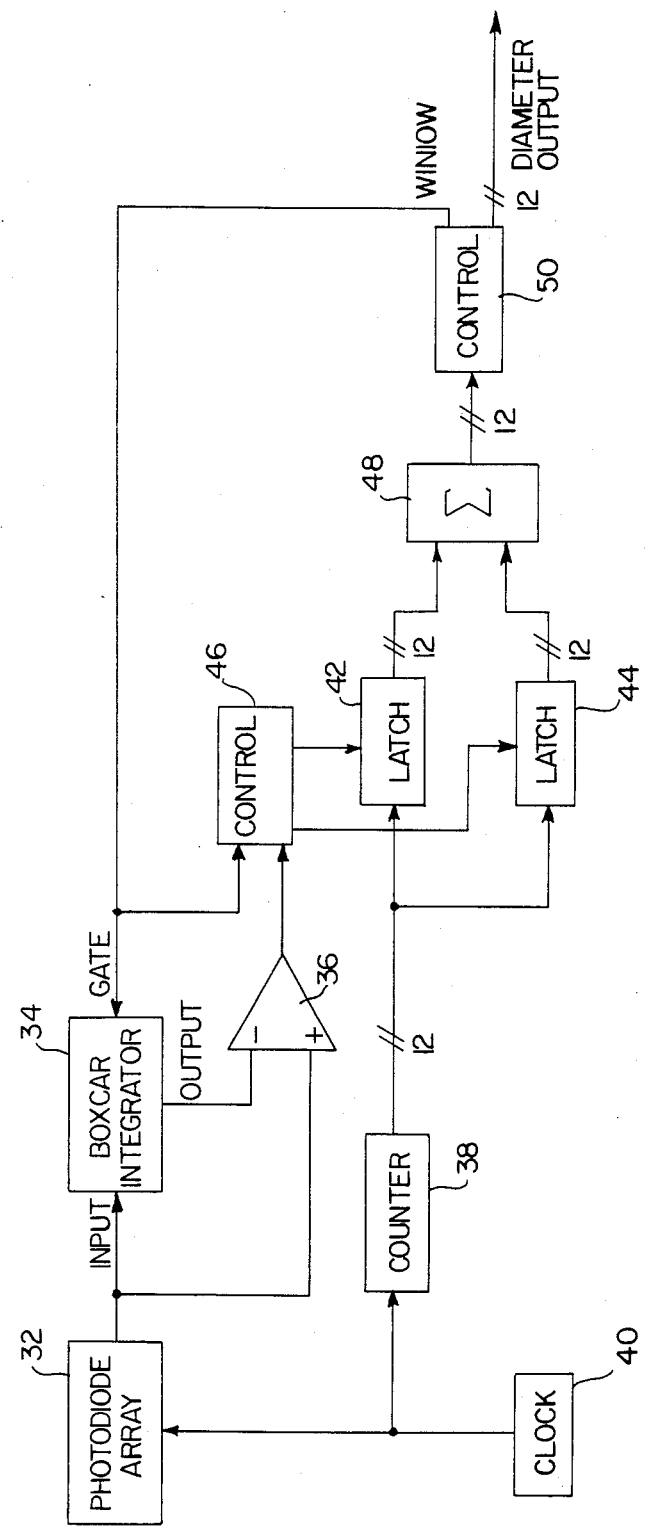
FIG. 3 is a functional block diagram of circuitry for monitoring a peak of the interference pattern resulting from passing a focused laser beam through the crystal fiber.

The output of the photodiode array is transmitted to electronic circuitry shown generally in FIG. 3 which functions to lock onto one of the peaks of the interference pattern and to track the location on the diode array of the center of that peak as it moves in response to diameter changes in the fiber. A boxcar integrator 34 receives the signal 56 from the array 32 with the output 58 of the boxcar sintegrator being equal to the average value of the fringe bracketed by the window signal 60 as illustrated in FIG. 4. A comparator 36 receives inputs from the array 32 and integrator 34 and changes state on the steeply changing portions of the fringe signal.

A counter 38 is connected to the output of the clock 40, the output of the counter being applied to latches 42, 44. A control circuit 46 responsive to comparator 36 latches the output of the counter at the rising and falling edges of the comparator output that occur during a window interval.

The sum of the two latch outputs thus represents twice the value of the center of the fringe. The outputs of latches 42, 44 are summed at 48 which represents twice the value of the center of the fringe. Control circuit 50 compares this value to the center of the previous measurement. If the difference is too large the measurement is assumed to be due to an anomalous optical or electronic event, and the output is not updated. If the new point is valid, the current fringe position measurement is transferred to the output and the window position is changed by the same increment. This cycle repeats every scan of the photodiode array, or approximately once per millisecond. This derived signal represents a relative change in diameter and not the absolute diameter. Thus, a starting diameter measurement must be known to obtain the absolute diameter.

Figure 5:
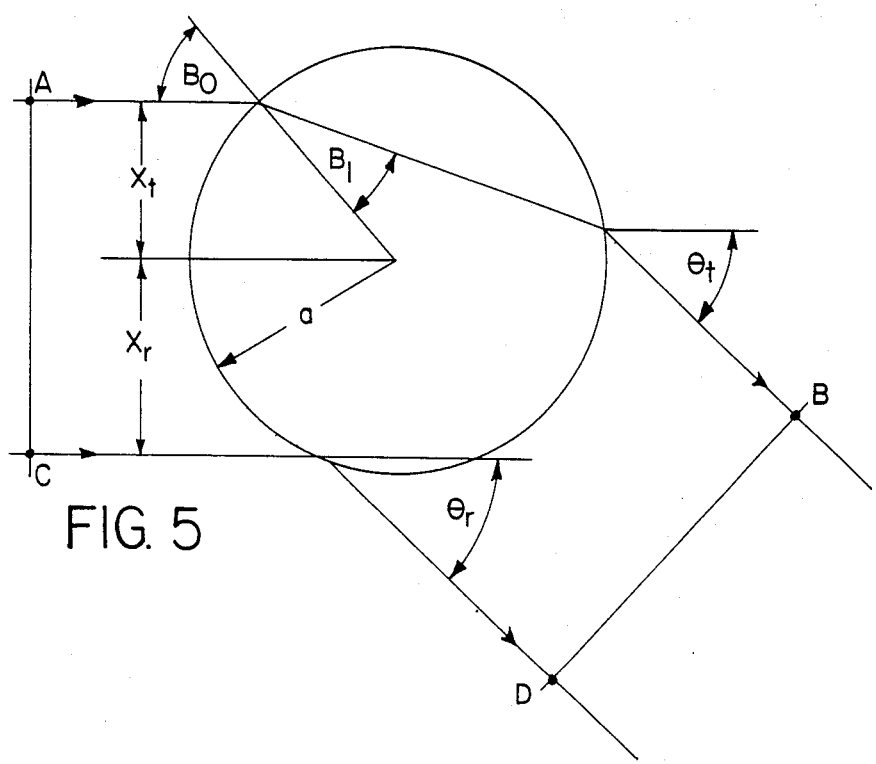
FIG. 5 is a schematic illustration of path length differences between rays refracted and reflected off of a fiber at a given angle theta.

In order to determine the resolution of the system, it is necessary to calculate the shift in angle of a peak due to a given change in fiber diameter. As discussed by Watkins, "Scattering From Side Illuminated Clad Glass Fibers for Determination of Fiber Parameters", *Journal, Optical Society of America*, 64, pg. 767, (1974), the fringe spacing can be described analytically by considering the path length difference $\Delta\theta$ between rays refracted through and reflected off the fiber at a given angle $\theta$, as illustrated in FIG. 5. The interference between these rays in the far field gives rise to a series of approximately sinusoidal fringes. The power scattered per unit angle at an angle $\theta$ can be written as $$P(\theta) = a_1(\theta) + a_2(\theta) \cos k\Delta(\theta) \tag{1}$$

where $k = 2\pi/\lambda$

An approximate ray optics calculation of the amplitude functions $a_1$ and $a_2$ is $$\bar{a}_1(\theta) = \frac{1}{2}\left[ R(\theta)\sin\frac{\theta}{2} + T(\theta)\left(\frac{1}{\cos\beta_0} - \frac{1}{n\cos\beta_1}\right)^{-1} \right] \tag{1a}$$

$$\bar{a}_2(\theta) = \left[ R(\theta)T(\theta)\sin\frac{\theta}{2}\left(\frac{1}{\cos\beta_0} - \frac{1}{n\cos\beta_1}\right)^{-1} \right]^{\frac{1}{2}} \tag{1b}$$

where $R(\theta)$ and $T(\theta)$ are the power reflection and transmission coefficients, respectively, and $$P(\theta) = P_0(a/l)[\bar{a}_1(\theta) + \bar{a}_2(\theta) \cos k\Delta(\theta)] \tag{1c}$$

where $P_0$ = incident laser power

The path length difference $\Delta(\theta)$ is given by Watkins, supra, as $$\Delta(\theta) = 2a[\sin\theta/2 + (n^2 + 1 - 2n\cos\theta/2)^{\frac{1}{2}}] + \lambda/4 \tag{2}$$

From Equations (1, 2 and 1c) it can be shown that $a_1(\theta)$ and $a_2(\theta)$ vary sufficiently slowly that it is adequate to take the maxima of the scattering pattern to lie at the maxima of the cosine function in Equation 2. The angular position $\theta_N$ of the Nth bright fringe is then given implicitly by $$k\Delta(\theta_N) = 2\pi(N - N_0) \tag{3}$$

where $\Delta(0) = (N_0 + \Sigma)\lambda$, $N_o$ is an integer and $\Sigma < 1$.

The change in position on the diode array of the Nth fringe, $\Delta x$, in response to a change $\Delta a$ in the fiber radius is $$\Delta x = f(\partial\theta_N/\partial a)\Delta a \tag{4}$$

With our detection system, the minimum resolvable position change is the diode spacing $\xi$. Thus, the minimum resolvable radius change is $$\Delta a_{min} = \left|\left(\frac{\partial\theta_N}{\partial a}\right)\right|^{-1} f^{-1} \xi. \tag{5}$$

We can calculate $\partial\theta_N/\partial a$ from Eqs. (1 & 2)

$$\frac{\partial\theta_N}{\partial a} = \frac{-2}{a} \frac{\sin\frac{\theta_N}{2} + \left(n^2 + 1 - 2n\cos\frac{\theta_N}{2}\right)^{\frac{1}{2}}}{\cos\frac{\theta_N}{2} + n\left(n^2 + 1 - 2n\cos\frac{\theta_N}{2}\right)^{\frac{1}{2}}\sin\frac{\theta_N}{2}} \tag{6}$$

If we write this relationship in the form $$(\partial\theta_N/\partial a) = -(1/a)g^{-1}(\theta_N, n) \tag{7}$$

then we arrive at a simple form for the diameter resolution:

$$(\Delta a/a)_{min} = (\xi/f)g(\theta_N, n). \tag{8}$$

Figure 6:
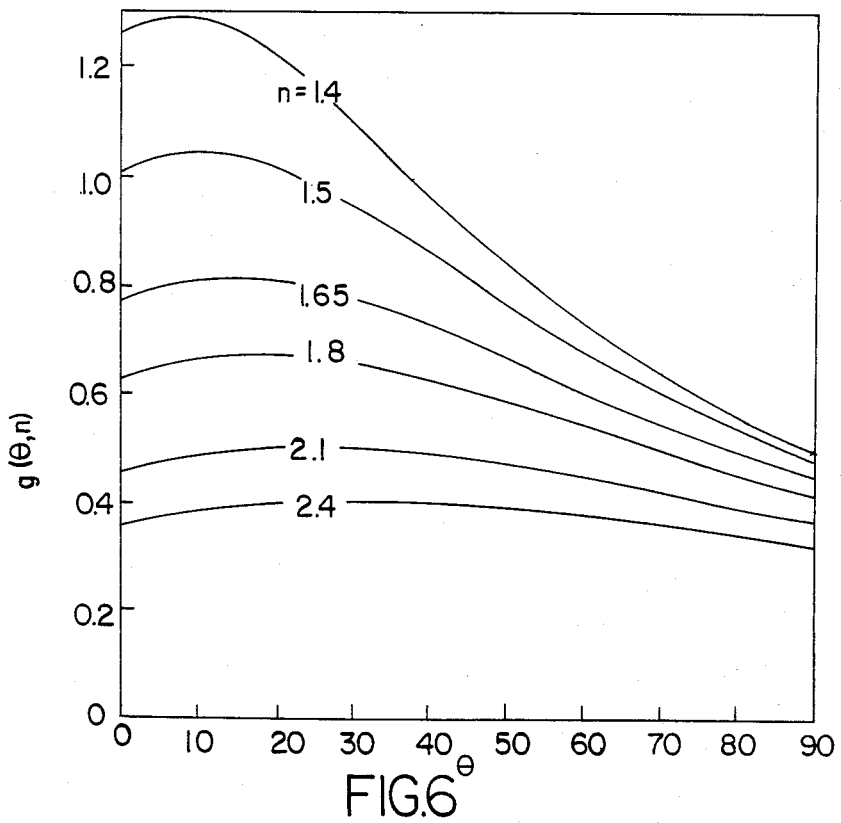
FIG. 6 is a plot of the scale factor, g, versus angle, $\theta$.

The function g is plotted in FIG. 6, and is seen to be bounded for cases of interest by $0.3 \leq g \leq 1.3$.

Note also that the resolution is independent of the laser wavelength. The qualitative explanation is that for a given $\Delta a$, the decrease with wavelength in the number of fringes below $\theta_N$ is exactly cancelled by a larger fractional shift per fringe, leading to exactly the same shift in the position of the Nth peak.

Putting in typical values for a transparent fiber $\xi = 50$ $\mu$m, f = 100 mm, $\theta_N = 1$ rad, g = 0.63, we calculate from Eq. (8): $(\Delta a/a)_{min} = 3.2 \times 10^{-4}$.

The dynamic range limitation occurs when the fringe moves off the diode array which consists of M elements.

This occurs for $(\Delta a/a)_{max} = \pm(M/2)(\xi/f) g(\theta_N, n)$, where we assume that the fringe is originally at the center of the array.

For $M = 512$ and the other values as above, we calculate from Eq. (8): $(\Delta a/a)_{max} = \pm 8\%$.

The scattering pattern of an opaque fiber can also be written in the form of Eq. (2). It can be shown from scalar diffraction theory that for $\theta \geq \lambda/\pi l$ $$a_1(\theta) = a_2(\theta) = (P_o\lambda/2\pi^{5/2}l\theta^2) \quad (9)$$

$$\Delta(\theta) = 2a\theta - (\lambda/2) \quad (10)$$

where $P_o$ = incident laser power and $l$ = beam waist in the plane perpendicular to the fiber axis. Since there is no refracted ray, the physical interpretation of $\Delta$ given earlier obviously no longer applies.

From Eqs. (3, 7 & 10) it is found that for an opaque fiber $$g(\theta, n) = g(\theta) = 1/\theta. \quad (11)$$

The linear increase in diameter resolution with the focal length of the Fourier transform lens predicted by Eq. (5) reaches an ultimate limit due to noise and nonuniform sensitivity of the elements of the photo diode array. To see where this limit occurs, it is necessary to calculate when the difference in the output of adjacent photodiodes at the comparator threshold differ by less than the noise. The voltage output of the $m_{th}$ element of the photodiode array is given by $$V_m = P(\theta_m) R_m T(\eta/f) + v_m$$

where $\theta_m$ = angular position of $m^{th}$ element
$R_m$ = responsivity of the $m^{th}$ element (V/joule)
$T$ = measurement time interval
$\eta$ = width of element of array
$v_m$ = noise voltage on $m^{th}$ element and
$P(\theta)$ is given by Eq. (2).

The difference in the output of adjacent diode elements is $$\delta V_m = V_{m+1} - V_m = [P(\theta_{m+1})R_{m+1} - P(\theta_m)R_m]T(\eta/f) + v_{m+1} - v_m \quad (14)$$

$$\delta V_m \simeq \frac{dP}{d\theta}\bigg|_{\theta_m} R_m \frac{\xi}{f} T(\eta/f) + (R_{m+1} - R_m)P(\theta_m)\left(\frac{T\eta}{f}\right) + \quad (15)$$

$$[v_{m+1} - v_m].$$

The first term in Eq. (15) can be evaluated from Eq. (1). If we assume $da_1/d\theta << a_2 k \partial \Delta/\partial \theta$, we have $$\delta V = S + E. \quad (16)$$

where $$S = a_2(\theta_m) k \frac{d\Delta}{d\theta}\bigg|_{\partial = \theta_m} R_m T \xi \eta/f^2$$

$$E = (R_{m+1} - R_m) a_1(\theta_m) T\eta/f + [v_{m+1} - v_m]$$

The first term S in Eq. (16) is the result for an ideal noiseless uniform diode array, while E represents deviations due to nonuniform response and noise. Note that S decreases more rapidly with f than does E. If f is chosen so that $S = E$, there is a one bit uncertainty in the location of the peak center. Thus we can find the optimum focal length $f_o$ for a given observation angle $\theta$ by solving $$S(f_o, \theta) = E(f_o, \theta). \quad (17)$$

Noting the relation between $\Delta a/a$ and f given in Eq. (8), and using Eqs. (1a, 1b, 16 & 17) we obtain a quadratic equation for the maximum usable resolution at a given angle $$-(\bar{a}_2 h/g^2)(\Delta a/a)^2 + (\bar{a}_1/2\pi g)(\delta R/R)\frac{\lambda}{a}(\Delta a/a) + \quad (18)$$

$$\tfrac{1}{2}\pi(E_o/P_oT)(\xi/\eta)(l/a)(\lambda/a) = 0$$

where $$h(\theta) = \frac{1}{a}\frac{\partial \Delta}{\partial \theta}$$

$$= \cos\frac{\theta}{2} + n\sin\frac{\theta}{2}\bigg/\sqrt{n^2 + 1 - 2n\cos\frac{\theta}{2}}$$

$E_o = R_m V_m$ is a noise equivalent energy, and $\bar{a}_1$ and $\bar{a}_2$ are dimensionless scattering coefficients defined in Eqs. 1a, 1b). Solving Eq. (18) for $(\Delta a/a)$ and minimizing the result with respect to $\theta$ yields $\theta_{opt}$, the optimum $\theta$ for a given experimental situation. Substituting $\theta_{opt}$ into Eq. (18) yields $(\Delta a/a)$, the maximum usable resolution.

Figure 7:
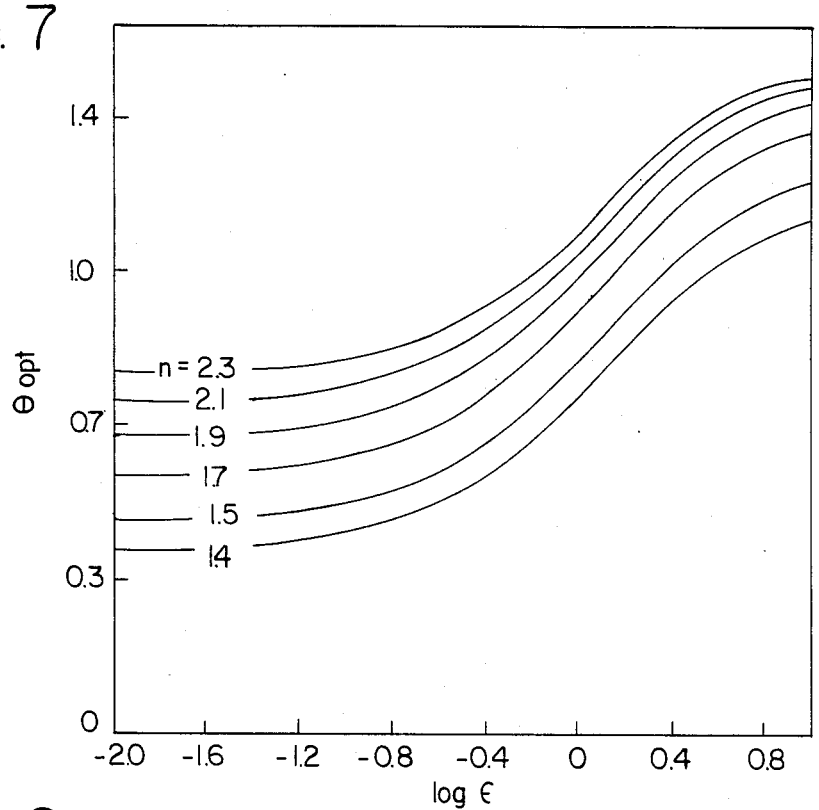
FIG. 7 is a plot of optimum theta versus a parameter characterizing the relative importance of non-uniform responsivity and noise of the photodiode array.
Figure 8:
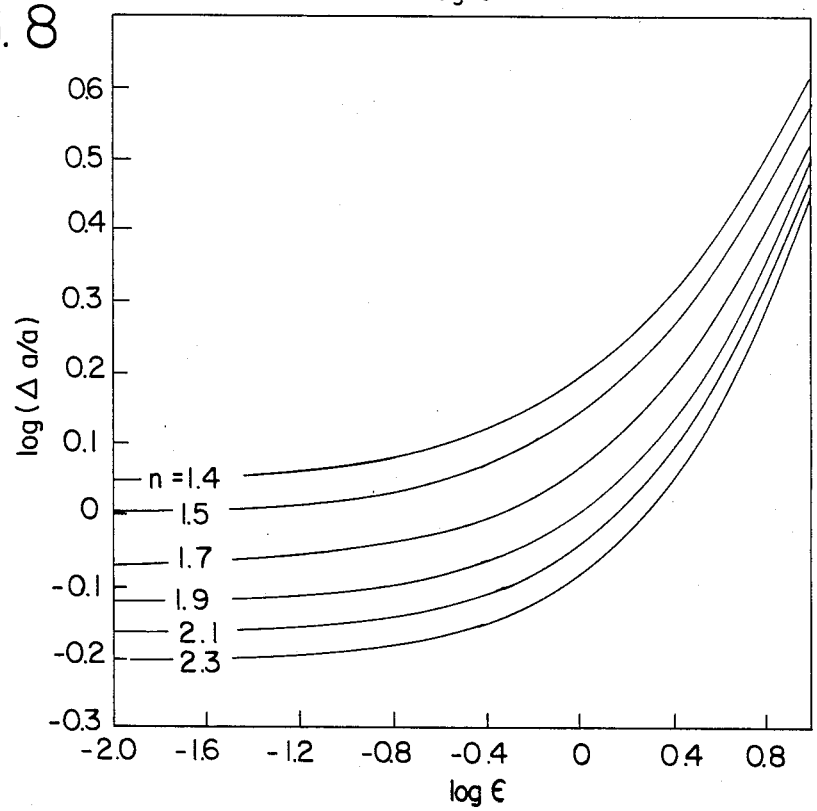
FIG. 8 is a plot of the logarithm of the optimized resolution.

FIG. 7 plots $\theta_{opt}$ versus a dimensionless parameter $\epsilon = (\delta R/R)\sqrt{(P_oT/E_o)(\eta/\xi)(\lambda/l)}$, which characterizes the relative importance of nonuniform responsivity and noise of the photodiode array. For large $\epsilon$, i.e. cases where noise is unimportant, $\theta_{opt}$ approaches large values, where the fringe contrast is maximum while for small $\epsilon$, i.e. cases where nonuniformity is unimportant, $\theta_{opt}$ approaches smaller values where the intensity of the fringes is maximum. The log of the optimized resolution $(\Delta a/a)_{opt}$ is plotted in FIG. 8.

For $P_o = 2$ mW, $T = 1$ mS, $E_o = 0.1$ pJ, $\eta/\xi = 1$, $l/a = 10$, $\delta R/R = 0.05$ and the other diode array parameters as in the previous example, we calculate $\theta_{opt} = 60°$, $(\Delta a/a)_{opt} = 3 \times 10^{-5}$, and $f_o = 1.1$ m for $n = 1.5$.

Note that these resolutions are a theoretical upper bound. Various practical considerations e.g. lens aberrations, minimum acceptable dynamic range, background light, adaptability to a variety of fibers and diameters, are often more serious limits than the diode noise and nonuniformity. We return to these questions in the section on experimental results.

Equation (17) can also be solved for an opaque fiber, using Eqs. (9, 10 & 16). For cases of interest the diode noise effects are much more important than the nonuniformity. In this limit the resolution is given by $$\frac{\Delta a}{a_{min}} = \left[\frac{\pi^{3/2}}{2}\frac{E_o}{P_oT}\frac{l}{a}\frac{\xi}{\eta}\right]^{\frac{1}{2}} \quad (19)$$

Using the apparatus described in FIG. 2, measurements were made at two values of $\theta$, 24° and 63°. The diameter resolution was obtained and the scale factor g (Eq. 8), was checked by comparing diameter measurements with the present system. For both sapphire (n = 1.76) and glass (n = 1.47) fibers, at both $\theta = 24°$ and $\theta = 63°$, for diameters ranging from 25 μm to 350 μm the g factor agree with the theoretical result, Equations (6 & 7), to better than 10%. For example, the measured resolution at $\theta=60°$ was $2.9\pm0.3\times10^{-4}$ for a glass fiber with $n=1.47$ while the resolution calculated with Eq. (8) was $3.0\times10^{-4}$. Small discrepancies may occur due to slightly ellipticity of the glass fibers used or the slightly hexagonal shape of the sapphire fibers.

Figure 9:
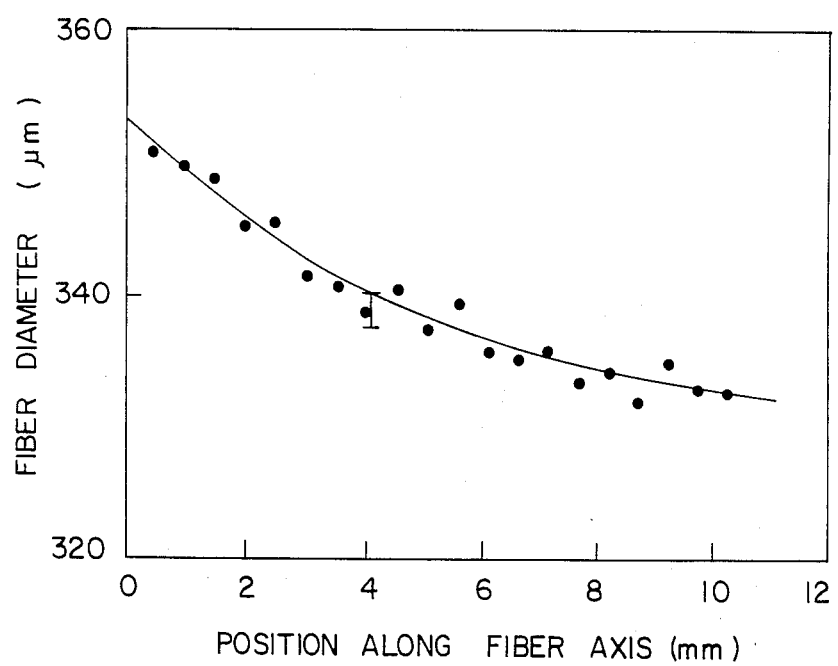
FIGS. 9 and 10 are plots of diameter measurements versus axial length for glass and ruby fibers, respectively.
Figure 10:
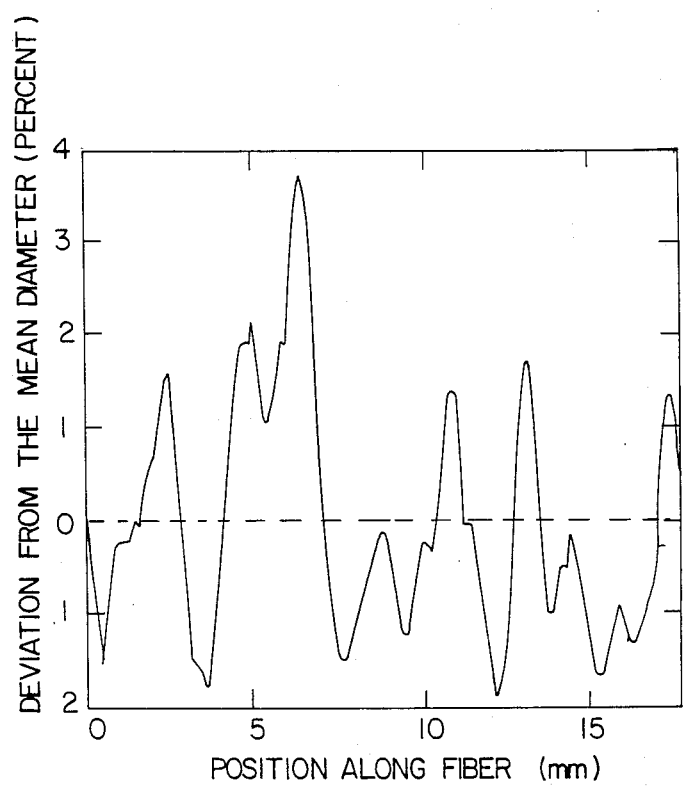

The output of the device was monotonic plus or minus a 1 bit jitter for scans of a smoothly tapered glass fiber. FIG. 9 shows a scan of a 350 μm glass fiber compared with measurements made with an optical microscope. FIG. 10 shows a scan of a 50 μm ruby fiber.

The fiber was mounted on an x-y stage to measure errors due to motion in the plane perpendicular to the fiber axis. At both the 24° and 63° measurement angle a 1 bit error window of 11 mm along the axis of the incident beam and 1.5 mm perpendicular to the axis of the incident beam. The former limit is due to lens aberration, the latter due to the small dimension of the unexpanded He-Ne beam.

While the invention has been described with reference to a specific embodiment, the description is illustrative of the invention and is not to be construed as limiting the invention. Various modifications and applications may occur to those skilled in the art without departing from the true scope and spirit of the invention.

What is claimed is:

1. Apparatus for obtaining a relative measurement of diameter of a fiber and the like comprising
   laser means,
   first lens means for focusing a beam from said laser means transversely on a fiber,
   a photodiode array,
   second lens means oriented at an angle to the axis of said beam for focusing a fringe produced by the fiber refracting an reflecting said beam onto said photodiode array, and
   means for detecting movement of said fringe on said array in response to a change in fiber diameter.

2. Apparatus as defined by claim 1 wherein said second lens comprises a Fourier transforming lens.

3. Apparatus as defined by claim 2 wherein said first lens means comprises a cylindrical lens.

4. Apparatus as defined by claim 3 wherein said laser means includes a laser source and variable attenuator.

5. Apparatus as defined by claim 4 wherein said means for detecting movement comprises circuitry responsive to the clocked output of said photodiode array for determining which photodiode is illuminated by said fringe.

6. Apparatus as defined by claim 5 wherein said circuitry includes averaging means responsive to output signals from said photodiode array and producing an average signal indicative of average power of a fringe, comparator means for comparing said average power with each signal from said array, counter means connected to means for clocking the outputs of said array, and latch means responsive to said comparator means for latching the count of said counter thereby indicating the center of a fringe on said array.

7. Apparatus as defined by claim 1 wherein said means for detecting movement comprises circuitry responsive to the clocked output of the total diode array for determining which photodiode is illuminated by said fringe.

8. Apparatus as defined by claim 7 wherein said circuitry includes averaging means responsive to output signals from said photodiode array and producing an average signal indicative of average power of a fringe, comparator means for comparing said average power with each signal from said array, counter means connected to means for clocking the outputs of said array, and latch means responsive to said comparator means for latching the count of said counter thereby indicating the center of a fringe on said array.

9. A method of determining relative diameter of a fiber and the like comprising the steps of
   directing a laser beam transversely onto said fiber,
   providing a transforming lens at an angle to said laser beam for receiving a fringe produced by the fiber refracting and reflecting said beam,
   focusing said fringe onto a photodiode array, and
   determining the position of said fringe on said array thereby determining angular movement of said fringe as fiber diameter changes.

10. The method as defined by claim 9 wherein said step of directing a laser beam includes providing a cylindrical lens for focusing said beam onto said fiber.

* * * * *